LIGHT-BOX

Original Filed Jan. 14, 1955 3 Sheets-Sheet 1

LIGHT-BOX

Original Filed Jan. 14, 1955 3 Sheets-Sheet 2

LIGHT-BOX

Original Filed Jan. 14, 1955 3 Sheets-Sheet 3

United States Patent Office

Re. 24,728
Reissued Oct. 27, 1959

24,728

LIGHT-BOX

Roger de Montebello, New York, N.Y.

Original No. 2,806,939, dated September 17, 1957, Serial No. 481,731, January 14, 1955. Application for reissue April 18, 1958, Serial No. 732,760

14 Claims. (Cl. 240—2)

Matter enclosed in heavy brackets [ ] appears in the original patent but forms no part of this reissue specification; matter printed in italics indicates the additions made by reissue.

The present invention relates to display devices and more particularly to a light-box especially well suited for the illumination of translucent display material as, for example, so-called transparencies.

It has long been known that for many display purposes translucent material lighted from the back or on the surface away from the viewer is much more effective than opaque material lighted from the front. This is particularly the case where the purpose of the display is to attract the interest of the viewer, as in the advertising field. However, light-boxes intended for such use have had various drawbacks. A serious problem encountered is that of effective or even lighting of the translucent material. This difficulty may perhaps be better appreciated when it is understood that the cost of such devices must be kept to a minimum. Another problem is created by the fact that it is important that the overall dimensions of the display device be kept at small as possible in keeping with the dimensions of the display material. Indeed, the requirement of avoiding bulkiness in the display device has often conflicted with the lighting requirements since the desired even diffusion of the light is adversely affected as the light source is brought closer to the material displayed.

It is also highly important, where transparencies such as photographic or X-ray transparencies as well as others are viewed that there be a substantially uniform distribution of the light passing through the transparency to the viewer. The examination and study of X-ray transparencies is often seriously impeded by uneven light distribution and in fact may result in entirely erroneous conclusions when the lack of proper light distribution is not taken into account. Furthermore, faulty light distribution may so distort the relative light values of different portions of a transparency as to render the work of any artist studying a transparency under such conditions extremely difficult. At the same time it is also important that the viewing device be compact and of rugged construction.

It is therefore a principal object of this invention to provide a display device in the form of a light-box in which there is efficient and greatly improved distribution of light over an entire surface of translucent material being displayed.

Another object is to provide such a light-box having substantially minimum overall dimensions, which is exceedingly shallow in depth from front to rear relative to its other dimensions while at the same time providing improved light distribution.

A still further object is to provide such a light-box in which the light is evenly distributed which may readily be manufactured by means of high speed mass production methods and at low cost.

In accordance with this invention, advantage is taken of the light-reflecting properties of some opalescent glass, self-diffusing transparencies or other translucent material which may be utilized as or with display material. A light source is utilized and so mounted adjacent the material that only part of its light travels directly thereto. Not all the light reaching the material is transmitted therethrough. A curved reflector is so positioned relative to the light source and the material that light received directly from the source as well as light reflected from the translucent material is redirected toward the material so as to effect an even distribution of light over the entire display material thereby avoiding the usual diminution of light reaching the portions of the display material more distant from the light source in accordance with the inverse square law.

Other objects as well as advantages of this invention will be apparent from the following detailed description thereof and the drawings in which.

Figure 1:
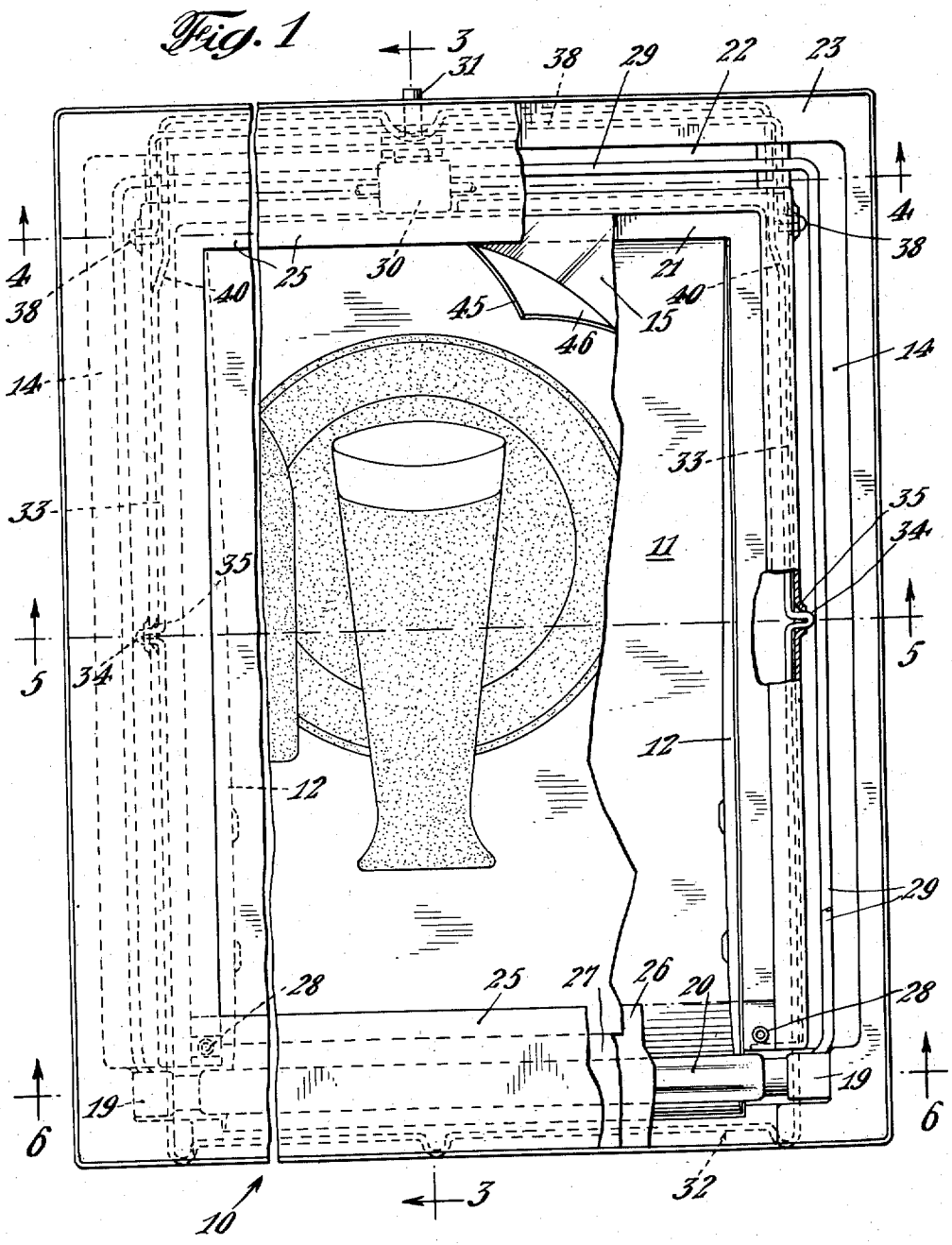
Figure 1 is a plan view of a light-box constructed in accordance with this invention.
Figure 2:
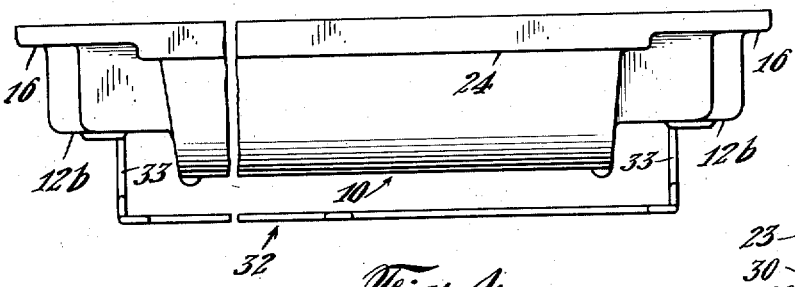
Figure 2 is an end elevational view of the device as viewed in Figure 1.
Figure 7:
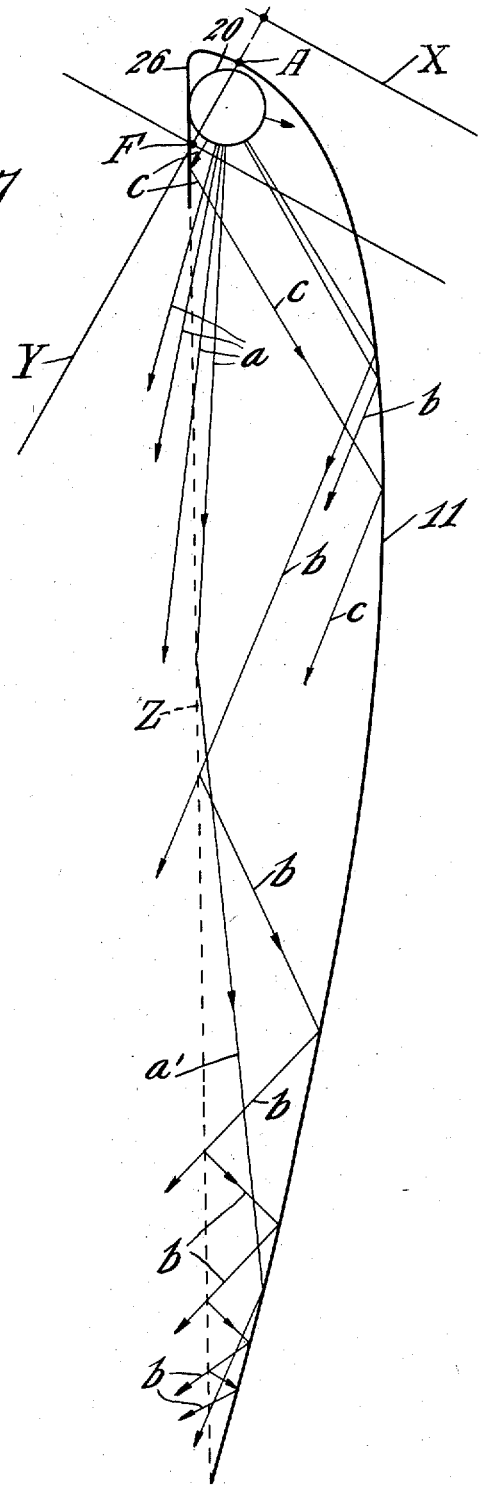

Figures 3, 4, 5 and 6 are cross sectional views taken respectively through the lines 3—3, 4—4, 5—5 and 6—6 of Figure 1; and Figure 7 is a diagrammatic view showing the operation of a light-box constructed in accordance with this invention.

Figure 3:
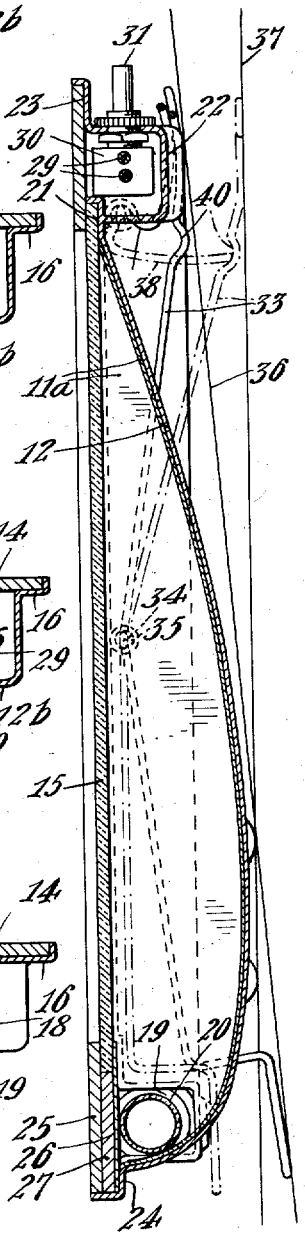
Figure 4:
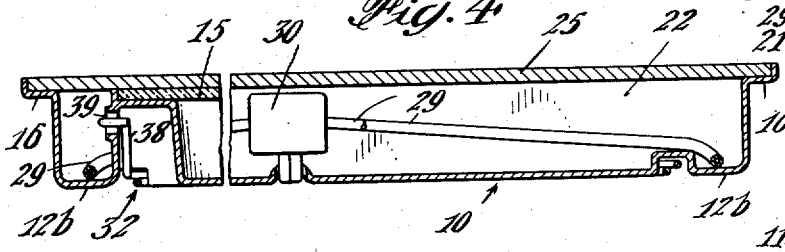
Figure 5:
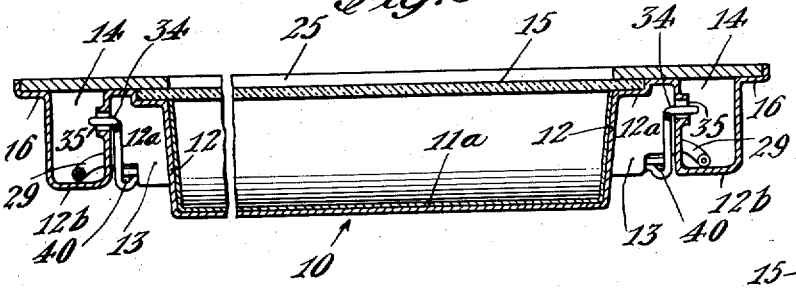
Figure 6:
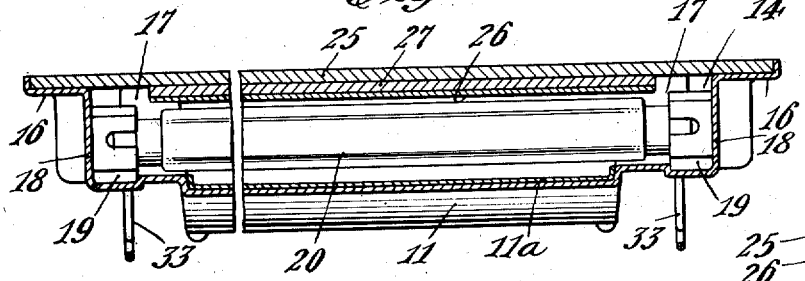

Referring now to the drawings in detail, light-box 10 comprises a reflector 11 which is generally parabolic in longitudinal cross section, vertically as viewed in Figures 1 and 3. Reflector 11 has connected thereto opposite side members 12 which together with the opposite extremities of reflector 11 define a substantially rectangular viewing area. Portions of side members 12 away from reflector 11 are turned outwardly to form two oppositely directed generally U-shaped channels 13, 14. Intermediate portion 12a of each of the side members forms channel 13 as well as an inner support for receiving translucent member 15. Outer channels 14 are formed by outer portions 12b of the side members which terminate in a peripheral flange 16 forming an outer seat immediately in advance of translucent member 15. The ends of side members 12 adjacent the focal end of reflector 11 are turned outwardly as indicated at 17 and are joined with the portions 12b thereof so as to close off the ends of channels 13 and afford communication between channels 14 and the area bounded by reflector 11.

Adjacent the outwardly turned portions 17, outer portions 12b are each turned inwardly and form longitudinally extending portions 18 which serve as supports for lamp sockets 19. A cylindrical fluorescent lamp 20 is supported between sockets 19 with its axis parallel to and in predetermined relation with the focus of reflector 11.

At its shallow end, reflector 11 forms a transversely extending support 21 which together with the inner supports formed by side member portions 12a serves to support translucent member 15. U-shaped channel member 22 extends transversely of reflector 11 adjacent to support 21 and along its outwardly presented side forms a flangelike support 23. At its deeply curved end reflector 11 also forms a transverse flangelike support 24 which together with supports 16 and 23 receive and support rectangular frame member 25.

Between lamp 20 and the overlying portion of frame member 25 there is provided a second reflector 26 which may be in the form of a relatively thin member as shown, spacer 27 of reduced width being provided to support frame member 25 as well as to insure proper positioning of member 15. Pins 28 projecting from the inner seating surface formed by side member portions 12a near lamp 20 engage reflector 26 and spacer 27 (Figure 1).

Conductors 29 extend from each of the sockets 19 through the adjacent one of channels 14 into the channel formed in member 22 and to switch 30. Switch 30 may be centrally supported in channel member 22 with switch member 31 projecting therethrough.

A convenient two-position stand for light-box 10 is provided by means of wire member 32, side members 33 of which extend in channels 13. Wire side members 33 each are bent to provide pivots 34 which snap into seats provided therefor in the walls of channels 14 as indicated at 35. Each of the side members 33 forms a relatively wide angle pivoted at its apex so that one or the other of the ends of the side members 33 may be used to steady or support the light-box depending upon the manner in which it is used. As shown in solid lines in Figure 3, wire member 32 is in the position suitable for positioning light-box 10 on a vertical or horizontal surface, indicated at 36, with side members 33 pivoted so that the ends thereof adjacent the deep end of reflector 11 are in engagement with surface 36 while the opposite ends of the side members are retracted. It is to be noted that normally the deep or lamp end of light-box 10 is upper most when it is positioned vertically as on a wall (see Figure 7) and away from the viewer when used horizontally. When positioned vertically on a horizontal surface, light-box 10 is readily disposed with its lamp end down. If it is desired that the viewing area be parallel to a horizontal surface then wire member 32 is pivoted in channel 13 to the position shown in dashed lines so that the portions thereof adjacent the lamp end of the light-box are retracted and the opposite ends thereof engage the surface indicated at 37. To secure wire member 32 in the alternate position, a locking member 38 is provided which may also be pivotally mounted in the inner wall of channel 14 as was described in connection with wire member 32, seats 39 being provided for that purpose. With side members 33 in the alternate position shown in dashed lines in Figure 3 lock member 38 is rotated clockwise to engage in recesses 40 formed in side members 33. Due to the resiliency of wire member 32 lock member 38 snaps into recesses 40 and remains thus engaged until released.

Preferably reflector 11 and side members 12 are integral as shown, being portions of a one piece back member having wing portions forming channels 13, 14 and molded from plastic material or shaped from other suitable material.

Whether the light source is a fluorescent lamp 20 as previously indicated or the type having an elongated tungsten filament mounted in a cylindrical light diffusing shell or a plurality of lamps arranged in a linear array, it is extremely important that the light source be properly located with respect to the curvature of the reflector 11 and the light reflecting properties of the interior of the light-box. As most clearly shown in Figure 7, reflector 11 has a minimum radius of curvature substantially at one end thereof defining an apex A and a maximum radius of curvature adjacent to the opposite end thereof. The shape of reflector 11 closely approximates a second degree parabola the characteristics of which, as shown diagrammatically in Figure 7, include axis Y, directrix X, apex A and focus F. In order to attain constant brightness over the entire viewing area, lamp 20 should be mounted between the focus F and apex A but spaced from the focus or focal axis. Mounting of the lamp at the focus causes uneven distribution of light over the viewing area which at times may take the form of visible striations. The parameter of the parabola is chosen such that it is of the order of approximately three times the diameter of the lamp.

The optimum location of the light source will vary to some extent with different types of reflective surfaces. Thus, as the specularity of the reflecting surfaces which include reflector 11, side members 12, second reflector 26 and the back of the material placed over the viewing area is decreased, and to some extent as the latter's transparent characteristics are increased, the light source is mounted closer to the apex. Where these reflecting surfaces have what may be considered 100% specularity for practical purposes, lamp 20 may be mounted closer to the focal axis than to the apex of reflector 11.

As has been previously indicated an important consideration in the construction of such devices concerns its depth. In general, it is necessary to maintain such devices as shallow as possible. In keeping with this, a relatively small angle is formed between the viewing area or the illuminated surface and the axis of symmetry, axis Y, of reflector 11. Axis Y extends in a plane which intersects focal axis F and apex A and the angle formed with the axis of the viewing area is small compared to the ninety degree angle.

Light-box 11 may be utilized in viewing transparencies which may be mounted on member 15 which may be clear glass, or, if desired, member 15 may be removed and the transparency mounted in its place, when the transparency is self-diffusing. The direction of the paths of various light rays are indicated in Figure 7. Those indicated by the reference character a are directly received on the glass with decreasing concentration away from the lamp 20. Paths b indicate light rays traveling from the lamp directly to reflector 11 and are substantially all reflected toward member 15 with increasing concentration along member 15 away from lamp 20. Paths c indicate light rays leaving the lamp in the direction of reflector 26, are reflected to the surface 11 and then follow paths similar to paths b. A certain proportion of the light rays a will not pass through member 15 but will be reflected as indicated by paths $a_1$.

Preferably, reflector 11, side members 12 and reflector 26 are opaque in addition to being reflective. It will be evident that side members 12 and reflector 26 serve the additional function of providing virtual images of the light source and related reflectors, thereby enhancing the level of illumination.

When the material utilized in the manufacture of the reflectors 11, 26 and side members 12 does not have the desired reflectivity and specularity it may be coated or have a covering of suitable material applied thereto. In the drawings, reflector 11 and side members 12 are shown covered with a metallic foil 11*a* having the desired specularity.

The illumination-equalizing effect of the light-box in conjunction with a translucent transparency such as one of the "Videx" type as discussed in U.S. Patent 2,647,336, issued August 4, 1953, may be increased as well as the absolute illumination by coating the back of the image preferably with metal such as aluminum or silver. The density of the coating is varied in accordance with the varying density of the image itself. In such an arrangement the results are better in the case of an image having a small proportion of very thin areas. In those cases where the thin areas predominate, the back metal coating will have little effect, being substantially restricted to small areas. As stated previously, in that case the lamp should be placed closer to the focus.

A further very useful and important manner of displaying material is possible in keeping with the present invention where, for example, the material 45 (Figure 1) being displayed on light-box 10 receives ambient light on its front face. Desired portions of display material 45 may be high-lighted or emphasized by applying an opaque light-reflecting coating 46 to the back surface of less significant portions of the material thereby permitting light from the source in the light-box to pass through only the desired portions of the material. This serves to make certain portions of the material eye arresting and may be utilized to advantage.

As has been indicated wire member 32 provides a stand useful in positioning light-box 10 horizontally so as to form a light-table or light-easel to facilitate its use in illuminating tracing paper, a work to be retouched or other surfaces. It is to be understood that while light-box 10 has been described as used in conjunction with back lighted material it may also be used for lighting in general.

In the present embodiment, an 8 watt fluorescent lamp was utilised as light source 20 and with the illuminated area ten inches by ten inches, the resulting illumination was substantially uniform over the entire area. Measurements made indicated the luminance to be approximately 100 foot lamberts. Furthermore, due to the nature of the reflecting surfaces and the low power light source made possible thereby, material in the illuminated area or on the illuminated surface is not subjected to appreciable or undesired heating and remains substantially cool. The close positioning of the lamp to the reflecting surfaces is believed to be of some effect in avoiding heat radiation to or hot spots on the illuminated surface. In particular the close positioning of reflector 26 with lamp 20 is important in this regard as well as others. As indicated in Figures 3 and 7, reflector 26 and lamp 20 are preferably positioned in direct physical contact.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A light-box having an opening formed therein, comprising a curved concave reflector having a concave reflecting surface of curved cross-section in one direction and planar cross-section in a second direction normal thereto and have its concave surface presented toward said opening, said concave surface having a minimum radius of curvature substantially at one end thereof defining an apex and a maximum radius of curvature adjacent to the opposite end thereof, said surface having a linear focal axis extending in said second direction, said focal axis and said apex extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, and the plane of said opening forming on the outside of said opening an angle with said plane of symmetry which is substantially smaller than ninety degrees.

2. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof, said surface having a linear focal axis extending in said second direction, said focal axis and said apex extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees and a second reflector extending solely adjacent to and substantially parallel with said light source on the side thereof away from said first mentioned reflector, said second reflector extending in a plane which intersects said plane of symmetry adjacent to said light source.

3. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees, and a second reflector extending solely adjacent to and substantially parallel with said light source on the side thereof away from said first mentioned reflector, said second reflector intersecting said plane of symmetry adjacent to said light source.

4. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof, and with the radius of curvature increasing substantially geometrically from said minimum radius of curvature to said maximum radius of curvature, said surface having a linear focal axis extending in said second direction, said focal axis and said apex extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees, and a translucent diffusing member closing said opening, said light source being adapted to provide light rays which are incident on said first reflector and said diffusing member, said diffusing member reflecting part of the light rays incident thereon toward said first reflector, said first reflector reflecting light rays incident thereon from said source and diffusing member toward said diffusing member along paths which diverge from said plane of symmetry.

5. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees, a translucent diffusing member closing said opening, and a second reflector extending solely adjacent to and substantially parallel with said light source on the side thereof away from said first mentioned reflector said second reflector intersecting said plane of symmetry adjacent to said light source, said light source being adapted to provide light rays which are incident on said first and second reflectors and said diffusing member, said diffusing member and said second reflector reflecting part of the light rays incident thereon toward said first reflector, said first reflector reflecting light rays incident thereon from said source, second reflector and diffusing member toward said diffusing member along paths which diverge from said plane of symmetry.

6. A light-box, comprising a unitary one-piece back member having a median portion forming a curved concave reflector having a concave reflecting surface of curved cross-section in one direction and planar cross-section in a second direction normal thereto, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, said back member further having wing portions forming light reflecting side members extending in said one direction, an elongated light source supported by said back member adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, and said median portion and side members defining an opening with the plane of said opening forming on the outside of said opening an angle with said plane of symmetry which is substantially smaller than ninety degrees.

7. A light-box, comprising a unitary one-piece back member having a median portion forming a curved concave reflector having a concave reflecting surface of curved cross-section in one direction and planar cross-section in a second direction normal thereto, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, said back member further having wing portions forming light reflecting side members extending in said one direction and a channel extending about said reflector, an elongated light source supported by said back member adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, switch means positioned in said channel, conductors extending in said channel and coupling said switch means with said light source, said median portion and side members defining an opening with the plane of said opening forming on the outside of said opening an angle with said plane of symmetry which is substantially smaller than ninety degrees, a translucent diffusing member closing said opening, and a second reflector extending solely adjacent to and substantially parallel with said light source on the side thereof away from said first mentioned reflector, said second reflector extending in a plane which intersects said plane of symmetry adjacent to said light source.

8. A light-box, comprising a unitary one-piece back member having a foil coating on a median portion thereof and forming a curved concave reflector having a concave reflecting surface of curved cross-section in one direction and planar cross-section in a second direction normal thereto, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, said back member further having wing portions having a foil coating and forming light reflecting side members extending in said one direction, an elongated light source supported by said back member adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, and said median portion and side members defining an opening with the plane of said opening forming on the outside of said opening an angle with said plane of symmetry which is substantially smaller than ninety degrees.

9. A light-box, comprising a unitary one-piece back member having a median portion forming a curved concave reflector having a concave reflecting surface of curved cross-section in one direction and planar cross-section in a second direction normal thereto, said concave surface having a minimum radius of curvature substantially at one end thereof defining an apex and a maximum radius of curvature adjacent to the opposite end thereof and with the radius of curvature increasing substantially geometrically from said minimum radius of curvature to said maximum radius of curvature, said surface having a linear focal axis extending in said second direction, said focal axis and said apex extending in a plane of symmetry of said surface, said back member further having wing portions forming light reflecting side members extending in said one direction, an elongated light source supported by said back member adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, said median portion and side members defining an opening with the plane of said opening forming on the outside of said opening an angle with said plane of symmetry which is substantially smaller than ninety degrees, and means forming a support including a wire-like member adapted for snap-in engagement with said wing portions.

*10. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof, said surface having a linear focal axis extending in said second direction, said focal axis extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, and the plane of said opening forming on the outside of said opening an angle with said plane of symmetry which is substantially smaller than ninety degrees.*

*11. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof defining an apex and a maximum radius of curvature adjacent to the opposite end thereof, said surface having a linear focal axis extending in said second direction, said focal axis extending in a plane of symmetry of said surface, an elongated light source mounted adjacent to said one end of said surface with its major axis spaced from and parallel to said focal axis and intermediate said apex and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees and a second reflector extending solely adjacent to and substantially parallel with said light source on the side thereof away from said first mentioned reflector, said second reflector extending in a plane which intersects said plane of symmetry adjacent to said light source.*

*12. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof and a maximum radius of curvature adjacent to the opposite end thereof, said surface having a linear focal axis extending in said second direction, said focal axis extending in a plane of symmetry of said surface, said surface substantially following a curve having a focal axis substantially coincident with the focal axis of said surface and a vertex adjacent to the minimum radius of curvature portion of said surface, an elongated light source mounted adjacent to said one end of said surface with its major axis spaced from and parallel to the focal axis of said surface and intermediate said vertex and the focal axis, said reflector extending partially about said light source and from a point adjacent said light source to a point remote therefrom for reflecting light rays incident thereon from said source along paths which diverge from said plane of symmetry, and the plane of said opening forming on the outside of said opening an angle with said plane of symmetry which is substantially smaller than ninety degrees.*

*13. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof and a maximum radius of curvature adjacent to the opposite end thereof, said surface having a linear focal axis extending in said second direction, said focal axis extending in a plane of symmetry of said surface, an elongated light source mounted adjacent to said one end of said surface with its major axis spaced from and parallel to said focal axis and intermediate the minimum radius of curvature portion of said surface and said focal axis, said reflector extending partially about said light source and from a point adjacent said light source to a point remote therefrom for reflecting light rays incident thereon from said source along paths which diverge from said plane of symmetry, and the plane of said opening forming on the outside of said opening an angle with said plane of symmetry which is substantially smaller than ninety degrees.*

*14. A light-box having an opening formed therein, comprising a curved concave reflector having a concave reflecting surface of curved cross-section in one direction and planar cross-section in a second direction normal thereto and having its concave surface presented toward said opening, said concave surface having a minimum radius of curvature substantially at one end thereof and a maximum radius of curvature adjacent to the opposite end thereof, said surface having a linear focal axis extending in said second direction, said focal axis extending in a plane of symmetry of said surface, an elongated light source mounted adjacent to said one end of said surface with its major axis spaced from and parallel to said focal axis and intermediate the minimum radius of curvature portion of said surface and said focal axis, said reflector extending partially about said light source and from a point adjacent said light source to a point remote therefrom for reflecting light rays incident thereon from said source along paths which diverge from said plane of symmetry, the plane of said opening forming on the outside of said opening an angle with said plane of symmetry which is substantially smaller than ninety degrees, and a second reflector extending solely adjacent to and substantially parallel with said light source on the side thereof away from said first mentioned reflector, said second reflector extending in a plane which intersects said plane of symmetry adjacent to said light source.*

References Cited in the file of this patent
or the original patent

UNITED STATES PATENTS

| | | |
|---|---|---|
| 1,661,077 | Marsatt | Feb. 28, 1928 |
| 1,846,533 | Thompson | Feb. 23, 1932 |
| 2,295,994 | Howe et al. | Sept. 15, 1942 |
| 2,335,951 | Mansell | Dec. 7, 1943 |

FOREIGN PATENTS

| | | |
|---|---|---|
| 669,180 | Great Britain | Mar. 26, 1952 |
| 1,012,098 | France | July 3, 1952 |